United States Patent
Shimada

[11] Patent Number: 5,922,073
[45] Date of Patent: Jul. 13, 1999

[54] SYSTEM AND METHOD FOR CONTROLLING ACCESS TO SUBJECT DATA USING LOCATION DATA ASSOCIATED WITH THE SUBJECT DATA AND A REQUESTING DEVICE

[75] Inventor: Kazutoshi Shimada, Yokosuka, Japan

[73] Assignee: Canon Kabushiki Kaisha, Tokyo, Japan

[21] Appl. No.: 08/773,898

[22] Filed: Dec. 27, 1996

[30] Foreign Application Priority Data

Jan. 10, 1996 [JP] Japan .................................. 8-001961

[51] Int. Cl.⁶ .................................................. G06F 11/00
[52] U.S. Cl. ............................................ 713/200; 713/202
[58] Field of Search ............................... 395/186, 187.01, 395/188.01, 726; 701/207, 208, 209, 210, 211, 212, 213, 214, 215, 216; 380/3, 4, 23–25; 705/18, 44; 707/9; 711/163, 164; 455/26.1; 340/988–996, 825.3; 342/357; 364/479.07

[56] References Cited

U.S. PATENT DOCUMENTS

| | | |
|---|---|---|
| 4,780,717 | 10/1988 | Takanabe et al. ..................... 340/995 |
| 4,993,067 | 2/1991 | Leopold .................................... 380/21 |
| 5,155,490 | 10/1992 | Spradley, Jr. et al. .................. 342/357 |
| 5,221,925 | 6/1993 | Cross ....................................... 340/988 |
| 5,243,652 | 9/1993 | Teare et al. ............................... 380/21 |
| 5,577,122 | 11/1996 | Schipper et al. ......................... 380/28 |
| 5,629,981 | 5/1997 | Nerlikar .................................... 380/25 |
| 5,659,617 | 8/1997 | Fischer ..................................... 380/25 |
| 5,754,657 | 5/1998 | Schipper et al. ......................... 380/25 |
| 5,757,916 | 5/1998 | MacDoron et al. ...................... 380/25 |
| 5,790,074 | 8/1998 | Rangedahl et al. ..................... 342/357 |

*Primary Examiner*—Joseph E. Palys
*Attorney, Agent, or Firm*—Fitzpatrick, Cella, Harper & Scinto

[57] ABSTRACT

Upon data access, an attribute-data extraction unit extracts location data and a password from attribute data which is added in advance to subject data to be accessed. At the time of requesting for an access to the data, the extracted password is compared with a password which is inputted from an input unit, and the extracted location data is compared with current location data detected by a location-data detection unit. An access permission unit permits access to the data in accordance with the comparison results obtained by the password comparison unit and the location-data comparison unit. By virtue of the process, it is possible to more strictly protect confidential information in a data processing apparatus.

22 Claims, 20 Drawing Sheets

FIG. 11

| DATA | PASSWORD | LOCATION DATA |
|---|---|---|
| ESTIMATE FOR COMPANY A | abcde | COMPANY A, OFFICE X |
| PRODUCT STRATEGY MEETING | fghij | OFFICE X |
| PRODUCT INTRODUCTION | klmno | — |
| ------- | ------- | ------- |

| NAME | TELEPHONE | NOTE | | | | |
|------|-----------|------|---|---|---|---|
| ABCD | 1234-5678 | DIRECTOR OF COMPANY A<br>TARGET SALES : ¥○○○○ | | | | |
| | | | | | | |
| | | | | | | |
| | | | | | | |
| | | | | | | |
| | | | | | | |

FIG. 14

ATTRIBUTE TABLE

| ☐ COMPANY A | ☑ MAIN OFFICE BUILDING |
| | ☐ FACTORY BC |
| ☐ COMPANY B | ☐ DISTRIBUTOR CD |
| | ☐ DISTRIBUTOR DE |
| | ☐ DISTRIBUTOR EF |
| ☐ COMPANY C | |
| COMPANY D | |

☐ WITHIN 1km AROUND SHINJUKU STATION

FIG. 15

| LOCATION NAME | RANGE DATA ||
|---|---|---|
| | LATITUDE | LONGITUDE |
| COMPANY A | ○ ~ ○ | △ ~ △ |
| MAIN OFFICE BUILDING, COMPANY A | □ ~ □ | × ~ × |
| | | |

FIG. 17

INPUT NEW ATTRIBUTE

NAME _____

LATITUDE _____ ~ _____

LONGITUDE _____ ~ _____

[ CANCEL ]  [ CONTINUE ]  [ OK ]

FIG. 18

INPUT NEW DATA OR CORRECT DATA
(CURRENT LOCATION)

NAME _____

RANGE ☐ 100m
☐ 200m

[ CANCEL ]  [ CONNECT ]  [ OK ]

FIG. 19
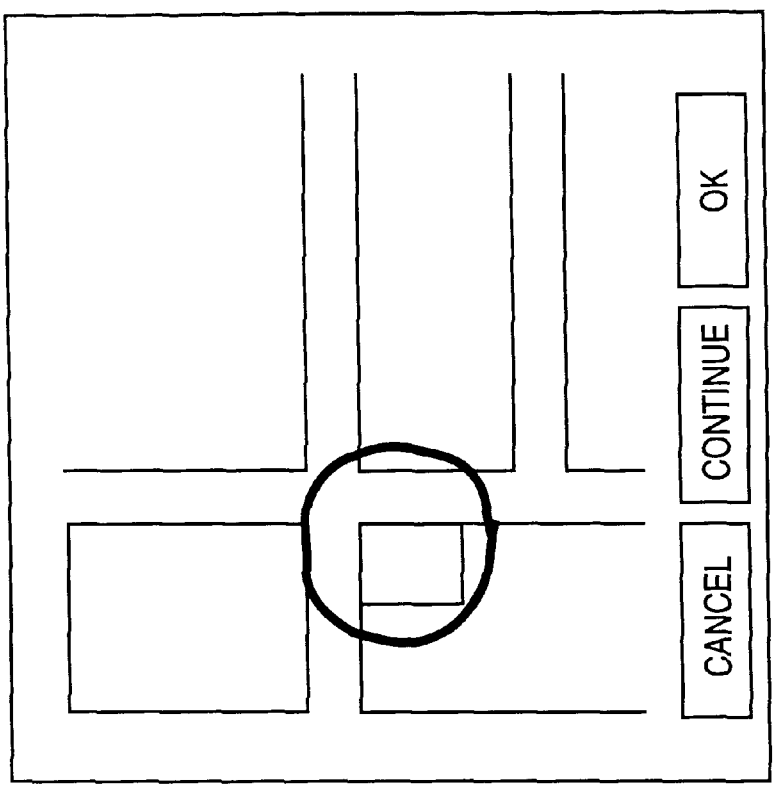
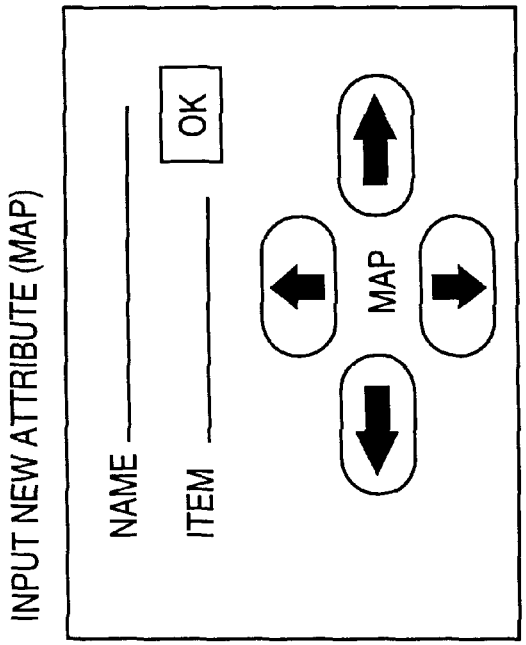

F I G. 25
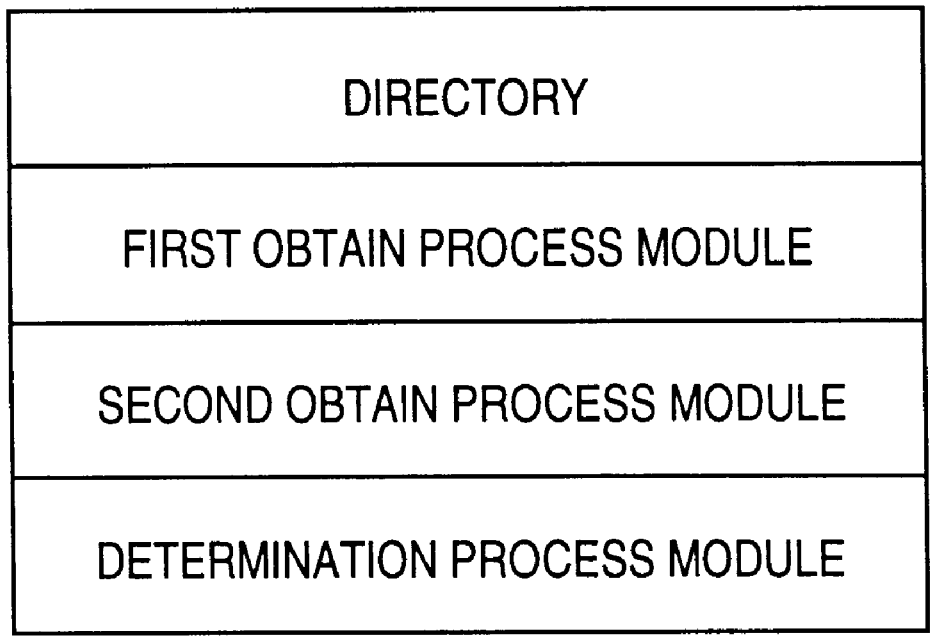

SYSTEM AND METHOD FOR CONTROLLING ACCESS TO SUBJECT DATA USING LOCATION DATA ASSOCIATED WITH THE SUBJECT DATA AND A REQUESTING DEVICE

BACKGROUND OF THE INVENTION

The present invention relates to a data processing method and a data processing apparatus as well as a data processing system for accessing data stored in the apparatus or in an external apparatus.

Along with the recent development in portable data processing apparatus, there are increasing cases where a person carries the apparatus outside a company with important information related to the company stored in the memory of the apparatus or in a secondary memory device. Also, data exchange between a company and the apparatus outside the company is performed via a modem or the like.

In such portable data processing apparatus, data is protected by requiring input of a password at the time of turning on power of the apparatus or at the time of opening a specific page of data. The purpose of such password input is to prevent other people from accessing confidential information or using it without permission in a normal situation, or preventing access when the portable data processing apparatus is lost by chance.

Furthermore, today, since communication lines are widely established, a password is basically used as a key to obtain data access permission to access remote data or data access operation among client servers.

Meanwhile, lately, for the purpose of automobile navigation, GPS (Global Positioning System) which is capable of calculating the position of an automobile by receiving data from orbital satellites is rapidly introduced to the market. Since its theory is well-known, details will not be provided herein; however briefly, data with respect to latitude, longitude, height, and radiated time of radio wave sent from twenty-four satellites circulating the earth, is received from at least four of the satellites, and correct position data of oneself or time data can be obtained. Since accurate time can be obtained by virtue of the above, this theory tends to be adopted not only to a portable apparatus but also to a non-portable desktop-type apparatus. For a portable apparatus, the GPS is expected to be applied not only to an automobile navigation system but also to a general PDA (Personal Digital Assistance: a small-size personal data processing terminal) or a subnotebook-type personal computer or the like by utilizing a PCMCIA card or the like.

As set forth above, a password is generally utilized as a key to data access permission. However, since a password is merely a combination of numbers and characters, it is possible for a hacker to generate the password by obtaining a number of possible sequences of characters. Moreover, a portable apparatus often utilizes a simple password with small number of digits, thus such password can be easily determined. Moreover, remote access operation is also problematic since confidential data is protected only by such password.

SUMMARY OF THE INVENTION

The present invention has been made in consideration of the above situation, and has as its object to provide a data processing method, apparatus and a system thereof which assure strict protection of confidential data subjected to an access.

Moreover, another object of the present invention is to assure strict protection of confidential data by determining permission or non-permission of a user on the basis of location data added to the confidential data and location data of an accessing point.

Further, another object of the present invention is to provide a data processing apparatus which can easily add the aforementioned location data to confidential data.

In order to attain the foregoing objects, the data processing apparatus according to the present invention comprises first obtain means for obtaining first location data which indicates a current location of said apparatus; second obtain means for obtaining location data with respect to subject data to be accessed as second location data on the basis of attribute data added to the subject data; and determination means for determining whether or not an access to the subject data is to be permitted in accordance with the first and the second location data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 shows an example of data configuration of a table to which attribute data is registered;

FIG. 12 is an explanatory view showing an example of setting attribute data in an address file;

FIG. 14 shows an example of a screen display at the time of setting location data according to the present embodiment;

FIG. 15 shows an example of data configuration in a location-data table;

FIG. 17 shows an example of a screen display at the time of setting a new location as location data according to the present embodiment;

FIG. 18 shows an example of a screen display at the time of setting a current location as new location data according to the present embodiment;

FIG. 19 shows another example of setting a new location as location data according to the present embodiment;

FIG. 25 is a view showing structural characteristics of control programs according to the present invention.

DETAILED DESCRIPTION OF THE PREFERRED EMBODIMENTS

Preferred embodiments of the present invention will be described in detail in accordance with the accompanying drawings.

<First Embodiment>

Figure 1:
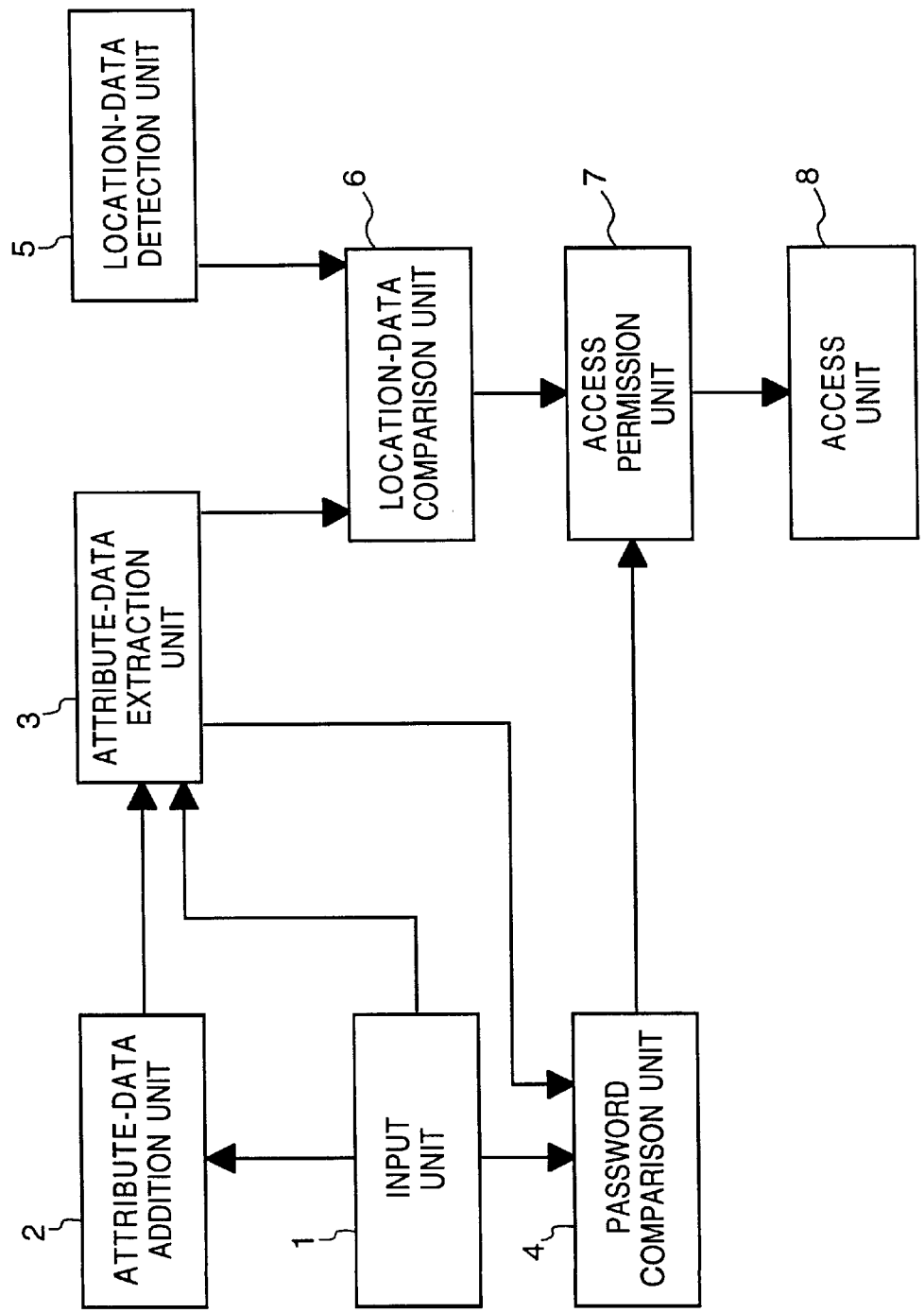
FIG. 1 is a block diagram for explaining a control structure at the time of data access according to a present embodiment.

FIG. 1 is a block diagram for explaining a control structure at the time of data access according to the present embodiment. In FIG. 1, reference numeral 1 denotes an input unit which performs various data input; 2, an attribute-data addition unit which adds attribute data e.g. a password, limitation of access locations and the like, to file data; and 3, an attribute-data extraction unit which stores attribute data added by the attribute data adding unit 2 to correspond to each of file data and extracts an attribute of subject data when an access request is sent to the subject data. In the present embodiment, since a password and location data are utilized as attribute data, the attribute-data extraction unit 3 outputs the extracted password to a password comparison unit 4, and the extracted location data to a location-data comparison unit 6 respectively.

Reference numeral 4 denotes the password comparison unit which compares a password inputted upon data access by the input unit 1 with a password added predeterminedly by the attribute-data addition unit 2 to the data subjected to be accessed. The comparison result is outputted to an access permission unit 7.

Reference numeral 5 denotes a location-data detection unit which detects a location of the subject apparatus by e.g. a GPS, and outputs the detected location data to the location-data comparison unit 6. Reference numeral 6 denotes the location-data comparison unit which compares location data, added in advance by the attribute-data addition unit 2 to the data subjected to be accessed, with location data inputted by the location-data detection unit 5. The comparison result is outputted to the access permission unit 7.

Reference numeral 7 denotes the access permission unit which determines permission or non-permission of an access to data in accordance with comparison results obtained by the password comparison unit 4 and the location-data comparison unit 6. Reference numeral 8 denotes an access unit which executes the access to data when the access is permitted by the access permission unit 7.

Figure 2:
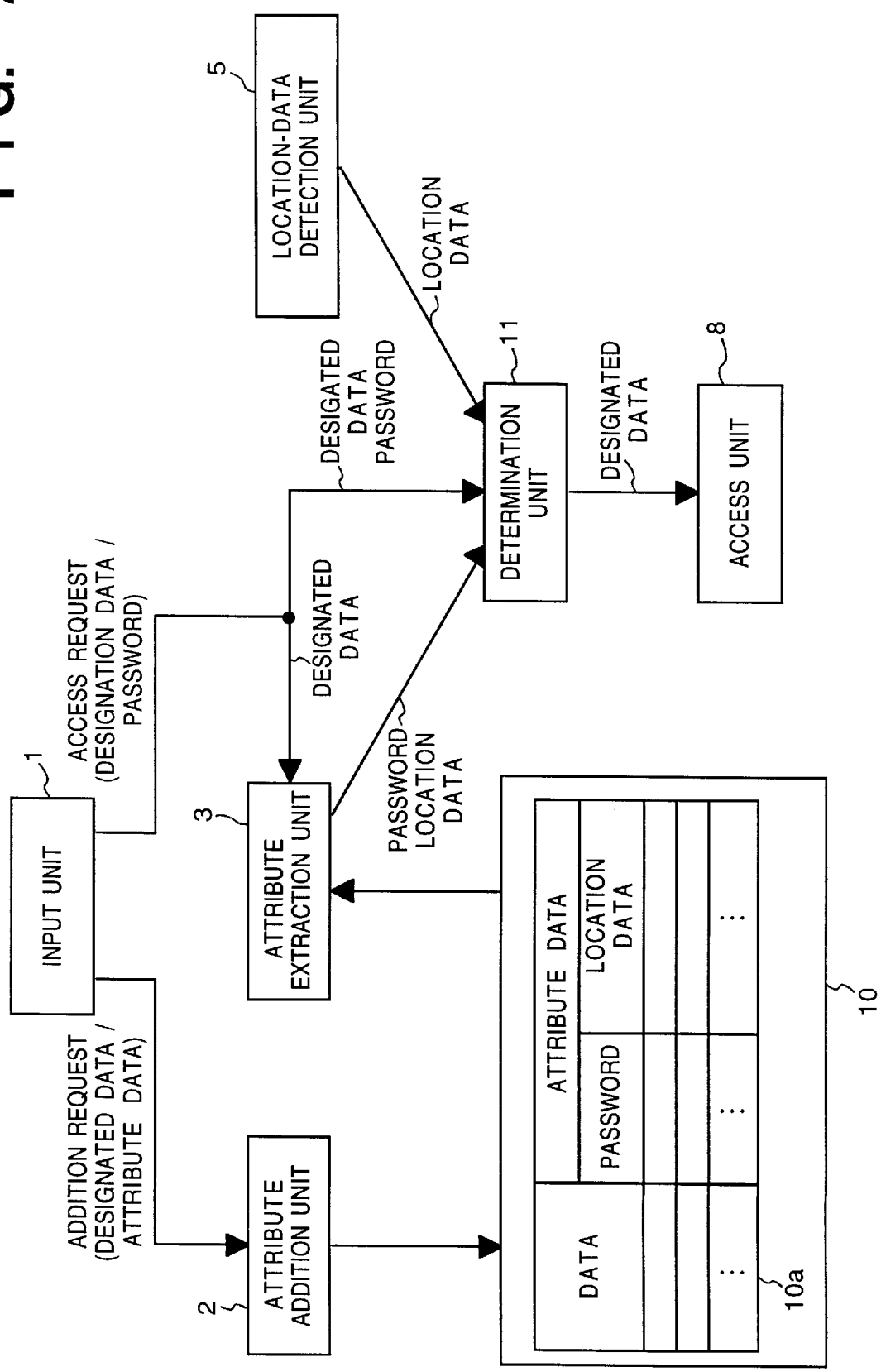
FIG. 2 is a block diagram for explaining a control structure associated with addition and extraction of attribute data.

With the foregoing configuration, adding operation of attribute data to file data and operation at which data access is requested will be described below with reference to FIG. 2. FIG. 2 is a block diagram for explaining a control structure associated with addition and extraction of attribute data. An addition request inputted from the input unit 1 includes attribute data to be added (a password and location data) and designation data which designates file data (e.g. file name) to which the attribute data is to be added. The attribute-data addition unit 2 which receives the addition request replaces attribute data of the designated data in a data-attribute table 10a included in a memory 10 with the attribute data included in the addition request. Next, operation associated with data access will be described. The access request inputted from the input unit 1 includes designation data which designates data subjected to be accessed and a password. The attribute-data extraction unit 3 reads out attribute data corresponding to data subjected to be accessed which is designated in the designation data from the data-attribute table 10a, and obtains location data and a password added to the data subjected to be accessed. The obtained location data and password are inputted to a determination unit 11. Location data detected by the location-data detection unit 5 and a password inputted by the input unit 1 are also inputted to the determination unit 11. The determination unit 11 including the password comparison unit 4, location-data comparison unit 6 and access permission unit 7, determines permission or non-permission of an access by the following procedure. The password comparison unit 4 compares the password inputted at the time of access request by the input unit 1 with a password extracted from the attribute extraction unit 3. Meanwhile the location-data comparison unit 6 compares current location data detected by the location-data detection unit 5 and location data extracted from the attribute extraction unit 3. The access permission unit 7 determines permission or non-permission of an access to the data in accordance with the comparison result of the password comparison unit 4 and the location-data comparison unit 6. The access unit 8 executes the access to the data when access is permitted.

Figure 3:
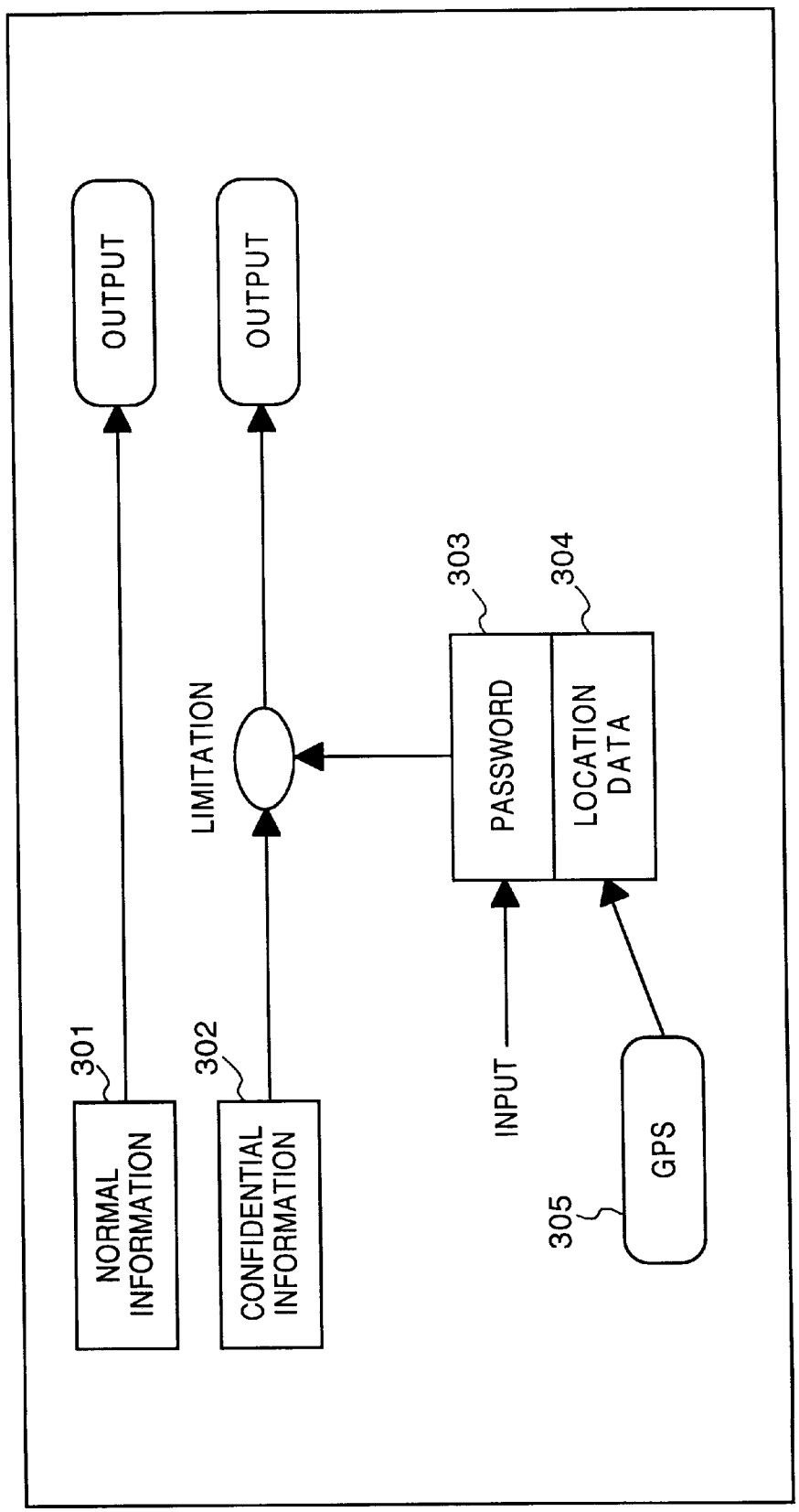
FIG. 3 is a conceptualized view of data access according to the present embodiment.

FIG. 3 is a conceptualized view of data access according to the present embodiment. Although two courses of data flow are indicated in FIG. 3, there can be more than two courses of data flow (access). To facilitate explanations, only two courses will be described in the present embodiment. One is a flow of normal information 301 which can be accessed with no limitation in user's general access conditions. The other is a flow of data such as confidential information 302 which cannot be obtained by normal operation, and in which an access is normally permitted by including confirmation data e.g. a password 303 into the flow. In the present embodiment, a current location of the apparatus (location data 304) obtained by GPS 305 is utilized as such confirmation data. By virtue of the above, an access from a location other than a specified location is not permitted.

Figure 4:
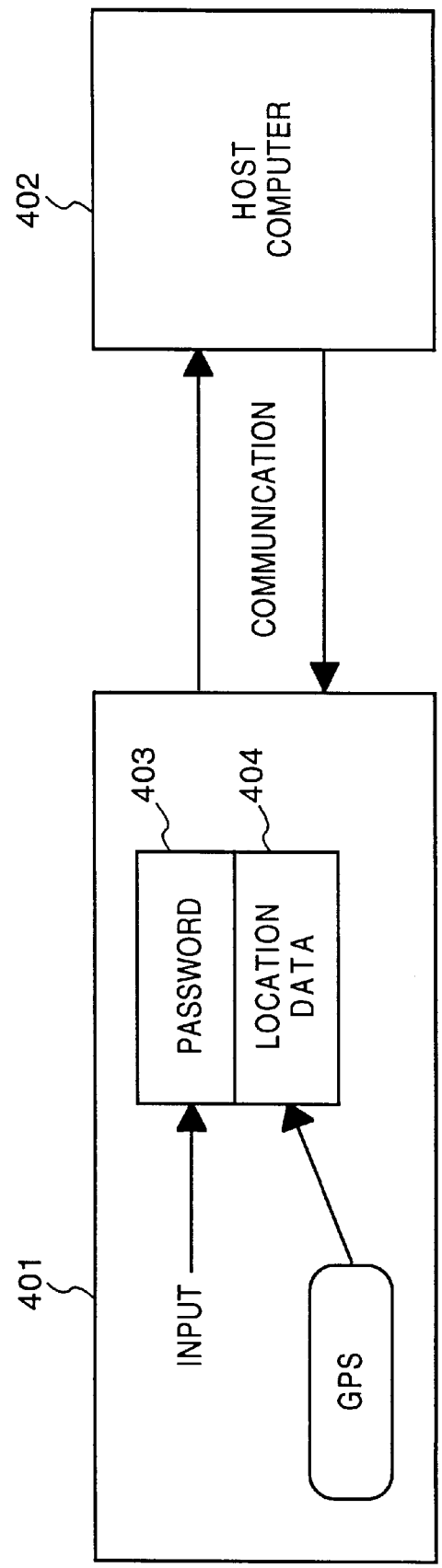
FIG. 4 is an explanatory view showing a concept of a process in a case where data is accessed via communication between data processing apparatuses.

FIG. 4 is an explanatory view showing a concept of a process in a case where data is accessed via communication between data processing apparatuses. Herein, descriptions will be provided for a case where a data processing apparatus 401 including a desktop computer accesses a host computer 402. For instance, in the non-portable type data processing apparatus 401 such as a desktop-type computer or the like, the current location of the apparatus (location data 404) is registered as confirmation conditions in addition to an ID number and a user password 403. Access permission or non-permission is determined based on the confirmation conditions. The host computer 402 may check matching of the confirmation conditions either at the time of log-in or at the time of requesting access to a specified data. Note that in a case of a portable data processing apparatus, an access location is also registered to limit the location to be used.

Figure 5:
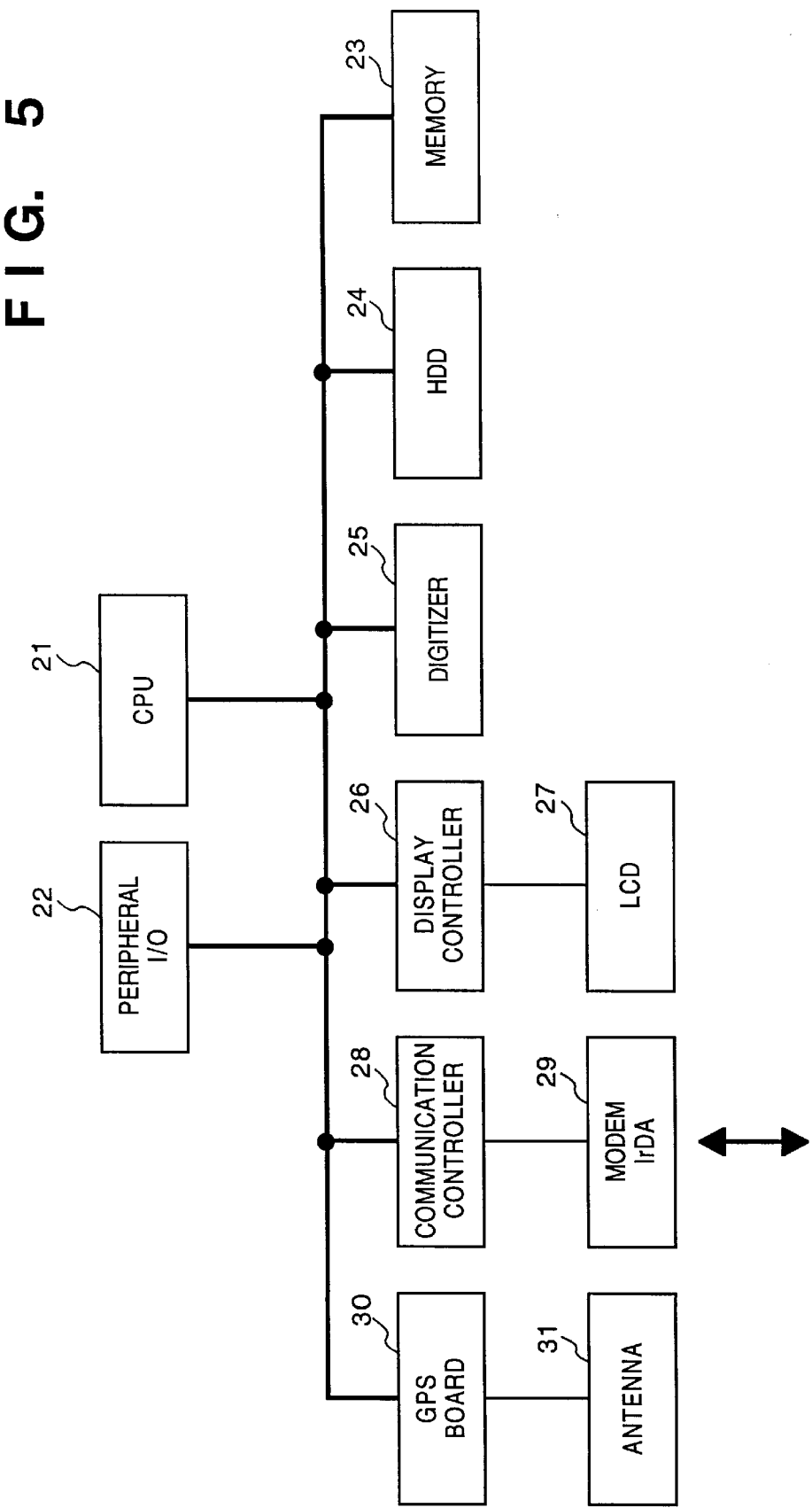
FIG. 5 is a block diagram showing a structure of a data processing apparatus according to the present embodiment.

FIG. 5 is a block diagram showing a structure of a data processing apparatus according to the present embodiment. A CPU 21, e.g. a controller having 32 bit or 16 bit, controls the entire apparatus and executes applications. The functions of each block shown in FIG. 1 are realized by the CPU 21 executing predetermined control programs. A peripheral I/O 22 paired with the CPU 21 is a chip set and is an IC for controlling peripheral I/O (interruption control, serial/parallel communication, RTC (Real Time Clock) or the like). A memory 23 constituted with a RAM and a ROM, is used as a storage area or work area of control execution programs. An HDD 24 is hard disk which stores application programs, user's data or the like.

A digitizer 25 is a device for converting track of a pen into a coordinate value, and is used to designate an area on an image displayed on a display unit, or to input menu selection or characters. A display controller 26 is a controller for displaying an image on a display unit 27 (LCD is used in the present embodiment). A communication controller 28 is connected to a phone line or the like via a communication unit 29 which includes a modem or an optical communication unit (IrDA) to exchange data with an external apparatus e.g. other computers, a facsimile apparatus or the like. Communication may be realized via LAN as a matter of course. The communication medium at this stage may be wire or wireless, and data may be digital or analog. A GPS board 30 is a device for detecting a location based on data sent from orbital satellites, and signals from the satellites are picked up by an antenna 31. Note that the input unit 1 in FIG. 1 includes the digitizer 25 and communication unit 29 and the like. The location-data detection unit 5 is constituted by the antenna 31 and GPS board 30. The memory 10 storing the data-attribute table 10*a* shown in FIG. 2 is assumed to be included in the HDD 24; however, if the memory 23 includes a non-volatile area with a battery backup, the memory 10 may be constituted by the memory 23.

Figure 6:
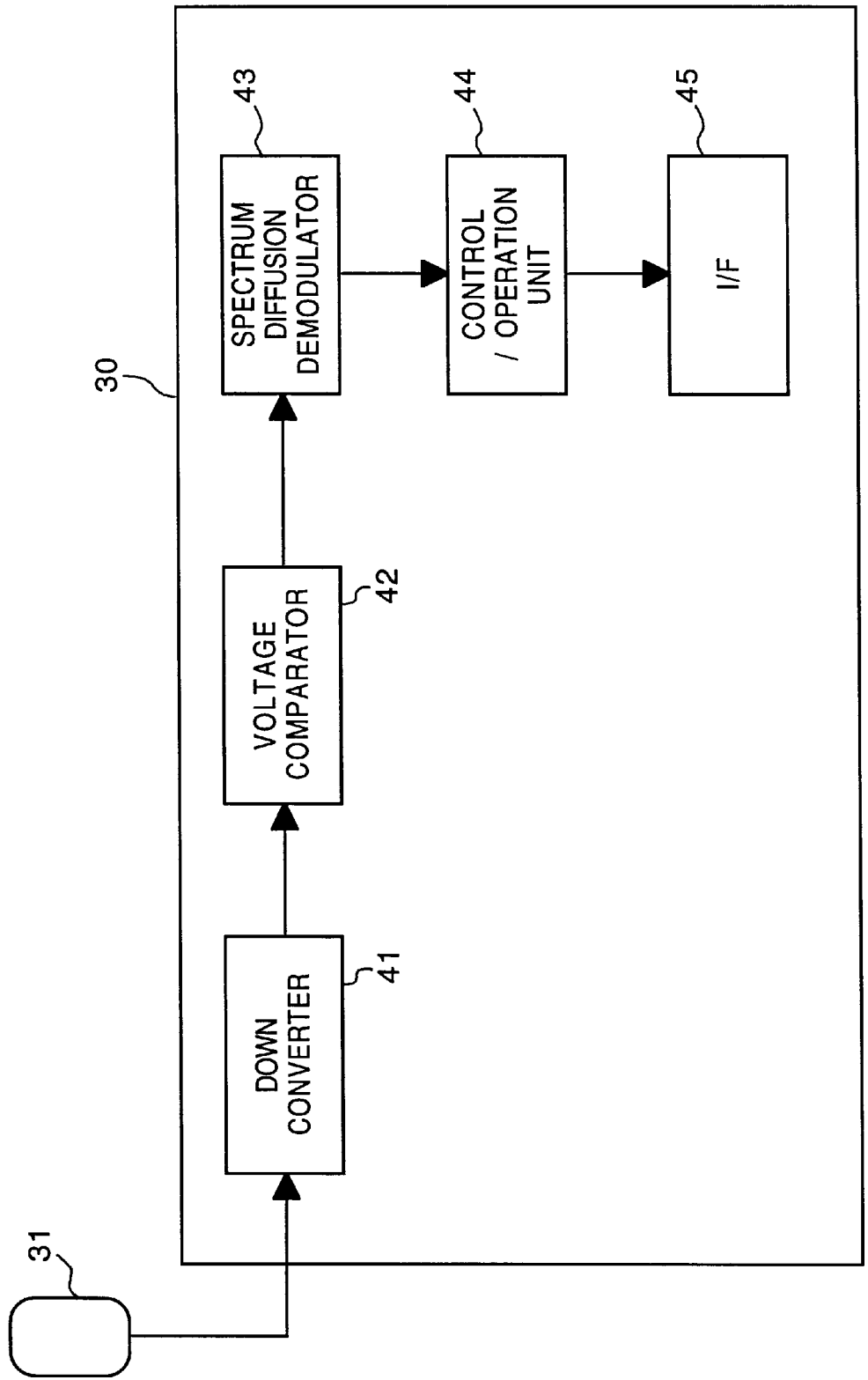
FIG. 6 is a block diagram showing an outline of a circuit structure of a GPS board 30.

FIG. 6 is a block diagram showing an outline of a circuit structure of the GPS board 30. Carrier frequency of satellite wave obtained by the antenna 31 is 1.57542 GHz. The frequency is converted to an intermediate frequency signal IF (2 MHz to 5 MHz) by a down converter 41. The signal is then digitized by a voltage comparator 42, and at a spectrum diffusion demodulator 43 a spectrum diffusion signal is demodulated by multiplying by PN (pseudo noise) codes. A control/operation unit 44 constituted with a CPU, a memory and the like, calculates a location of itself on the basis of a plurality of modulated data from the satellites. An I/F 45 is an interface for connecting the GPS board 30 and the CPU 21 of the main body.

Figure 7:
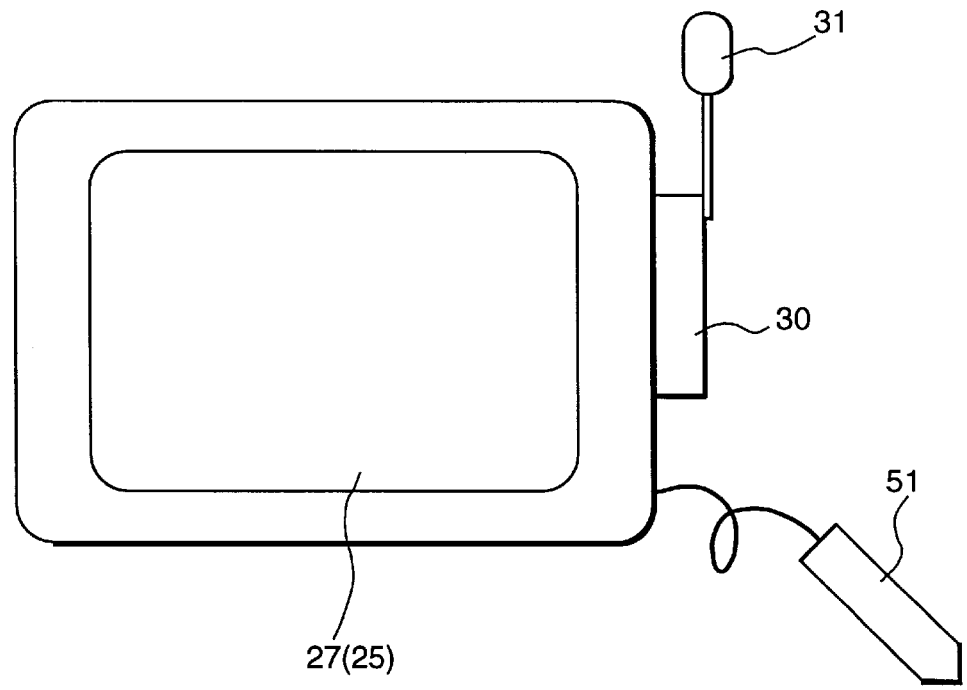
FIG. 7 is a drawing of a portable-type data processing apparatus employing the present embodiment.
Figure 8:
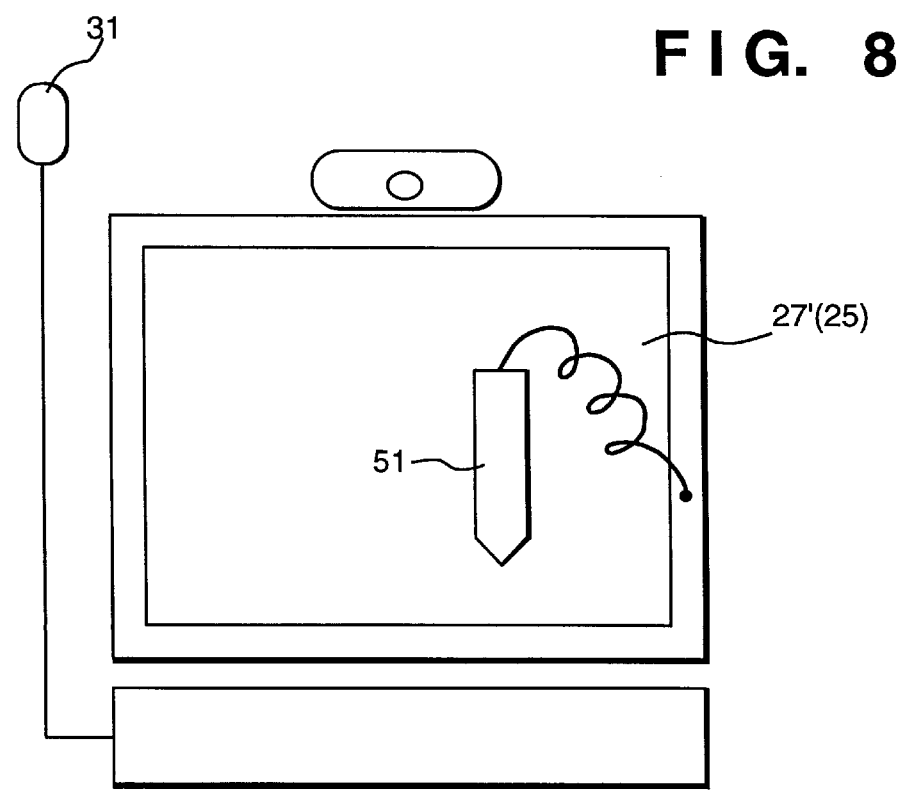
FIG. 8 is a drawing of a non-portable type data processing apparatus (desktop-type computer) employing the present embodiment.

FIG. 7 is a drawing of a portable-type data processing apparatus employing the present embodiment, and FIG. 8 is a drawing of a non-portable type data processing apparatus (desktop-type computer) employing the present embodiment. A pen 51 is utilized as an input device, however a keyboard may be utilized. The display unit 27 (27') incorporates the digitizer 25, and a location designated by the pen 51 is detected and inputted data is obtained.

Figure 9:
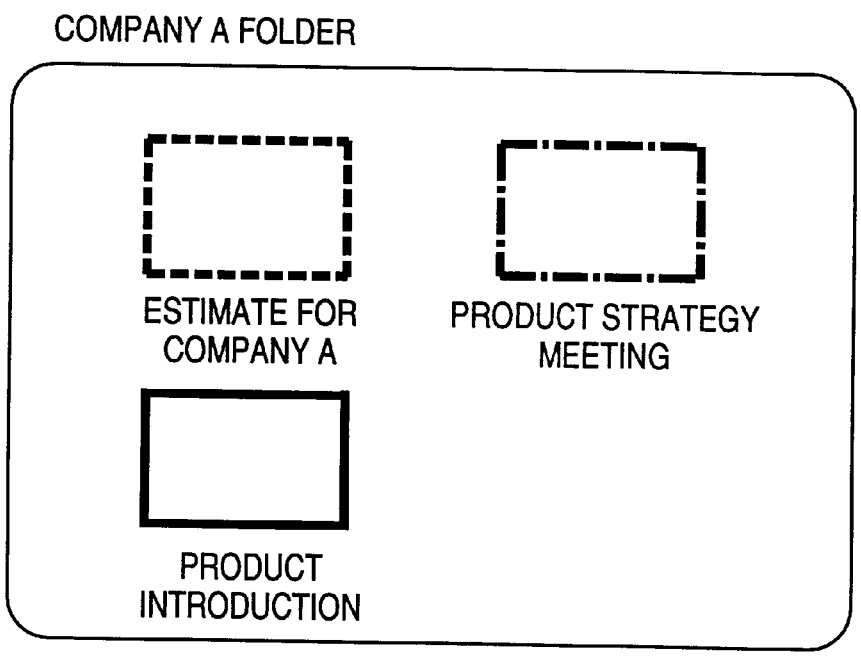
FIG. 9 shows an example of a screen display according to the present embodiment.
Figure 10:
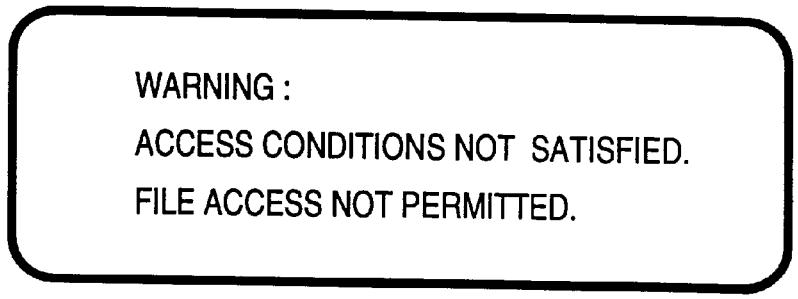
FIG. 10 shows an example of a screen display in a case where data access is not permitted in the present embodiment.

Next, descriptions will be provided with respect to screen display by the data processing apparatus according to the present embodiment. FIG. 9 shows an example of a screen display according to the present embodiment. FIG. 10 shows an example of a screen display in a case where data access is not permitted in the present embodiment. In FIG. 9, one folder (herein, a folder named "Company A") includes three different attribute files (herein, "Estimate for Company A" "Product Strategy Meeting" and "Product Introduction"). Attribute data e.g. a password, location data and the like, is added to each of the files by the attribute addition unit 2.

Descriptions will be provided for an example of adding location data to each of the files. FIG. 11 shows an example of a table which indicates correspondence between file data and attribute data. The table shown in FIG. 11 corresponds to the data-attribute table 10*a* in FIG. 2. In the file "Estimate for Company A," a location of Company A and an office location of an apparatus' owner are registered as location data. Location data specifies a location where an access is permitted. Thus, an access to the file "Estimate for Company A" is possible only in Company A or in the office of the apparatus' owner. Moreover, since the file "Product Strategy Meeting" relates to a confidential matter of the office of the apparatus' owner, only the office location of the apparatus' owner is registered as location data. Location data is not added to the file "Product Introduction" since there is no access limitation to the data. Under the foregoing conditions, if an attempt is made to open the "Estimate for Company A" file in a middle of a city, or to open the "Product Strategy Meeting" file at Company A, location data would not match, thus a warning shown in FIG. 10 is displayed and an access to the data cannot be achieved.

Note that the foregoing descriptions are provided for the case where attributes (location data or the like) are set for each of file units; however, attributes may be set for each data of a file. FIG. 12 is an explanatory view showing an example of setting attribute data in an address file. Herein, suppose the address file includes name data, telephone number data and note data. It is assumed that the name data and telephone number data include no access limitation but the note data includes access limitation (location data) to limit the data access to an access at inside the office only. The setting of access limitation is realized by setting attribute data for each data field. In the example shown in FIG. 12, the name data and telephone number data can be accessed at any location, however the note data which includes highly-confidential information can be accessed at only a specified location such as inside the office.

Figure 13:
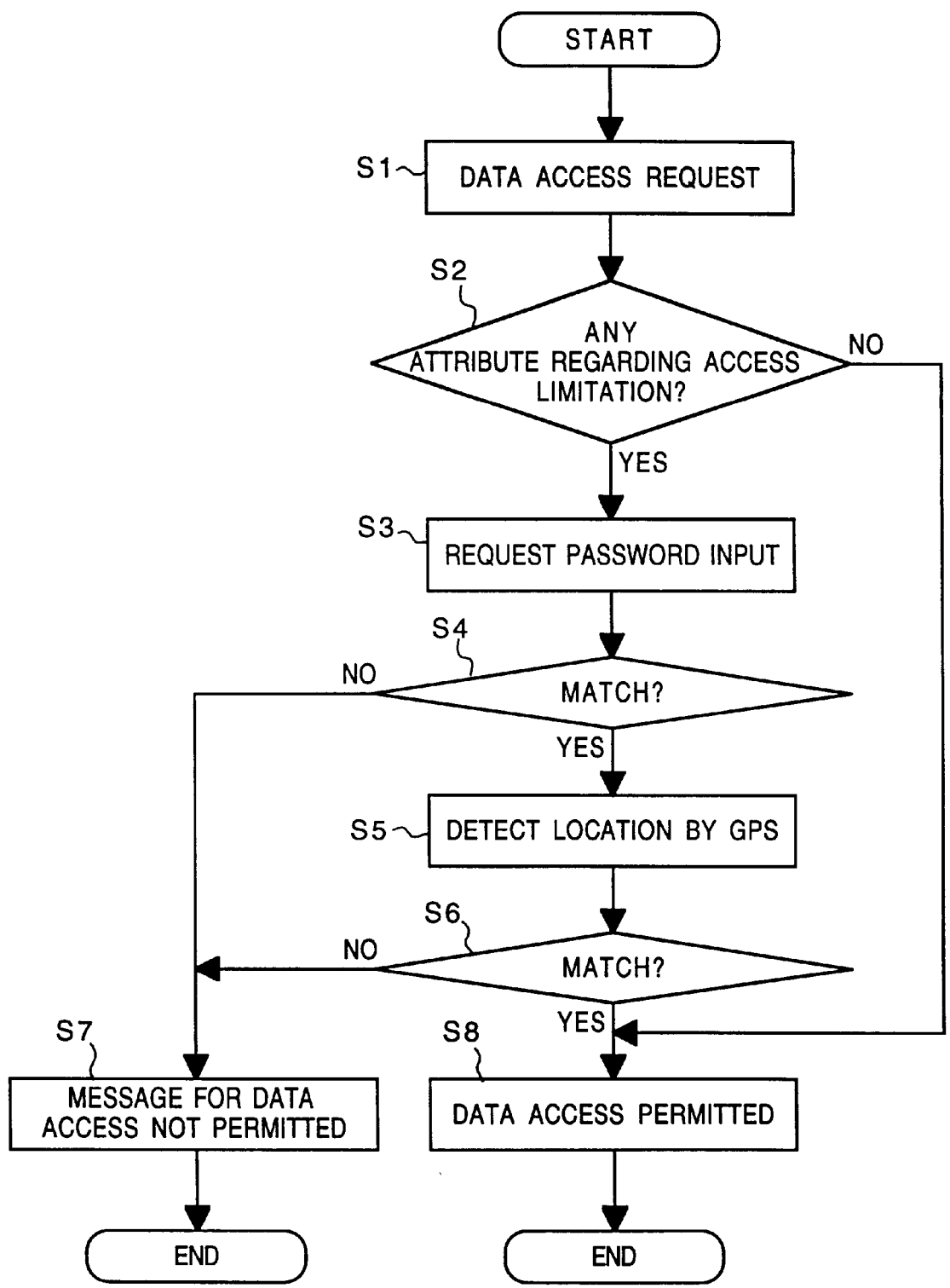
FIG. 13 is a flowchart describing processing steps at the time of data access according to the first embodiment.

FIG. 13 is a flowchart describing processing steps at the time of data access according to the first embodiment. When an access request to data (a file, an address file, a schedule file or the like) is received in step S1, the data-attribute table 10*a* is referred to in step S2 to determine whether or not the data includes any attributes related to access limitation. If it is found that the data includes no attribute with respect to access limitation, the processing proceeds to step S8, immediately permitting data access.

Meanwhile, when the data includes attributes with respect to access limitation, the processing proceeds from step S2 to step S3. In step S3, password input is requested. When a password is inputted from the input unit 1, the processing proceeds to step S4 where determination is made as to whether or not the inputted password matches with a predetermined password. That is, the attribute-data extraction unit 3 extracts a password of the data subjected to be accessed from the data-attribute table 10*a*, and the password comparison unit 4 compares the extracted password with the password inputted from the input unit 1.

If the passwords match in step S4, the processing proceeds to step S5. In step S5, a current location is detected by the location detection unit 5, and in step S6, determination is made as to whether or not the detected location matches with the location data added in advance by the attribute addition unit 2. That is, the attribute-data extraction unit 3 extracts location data of the data subjected to be accessed from the data-attribute table 10a, and the location-data comparison unit 6 compares the extracted location data with the current location data detected by the location-data detection unit 5.

As set forth above, when determination is made to permit access to the subject data on the basis of the password and location data, the processing proceeds to step S8 where the access permission unit 7 instructs execution of the access to the access unit 8, and the access is executed. Meanwhile, if match is not found for the password or the location data, the access request is rejected and a message as shown in FIG. 10 is displayed on the LCD 27.

Next, descriptions will be provided for a method of adding (operation of the attribute-data addition unit 2 in FIG. 1) attributes related to access limitation. FIG. 14 shows an example of a screen display at the time of setting location data according to the present embodiment. The figure is to explain the case where location data is added utilizing the location data that has been already registered. The location data is registered corresponding to a name, e.g. a main office building of Company A, by specifying a range of latitude and longitude. FIG. 15 shows an example of data configuration in a location-data table. The location-data table is stored in the HDD 24 or the like, and location names and corresponding range data (range of latitude and longitude) are registered therein. The attribute table shown in FIG. 14 is displayed referring to the location-data table in FIG. 15. Note that in the items of location data in the data-attribute table 10a in FIG. 11, location names corresponding to the location-data table may be registered, or values indicating ranges (accessible range from a central location) may be registered using latitude and longitude. The above described attributes may be added at any time. Also, although not shown in the drawings, the adding operation can be initiated by selecting an attributes-addition menu (already-defined location) from a predetermined menu.

Figure 16:
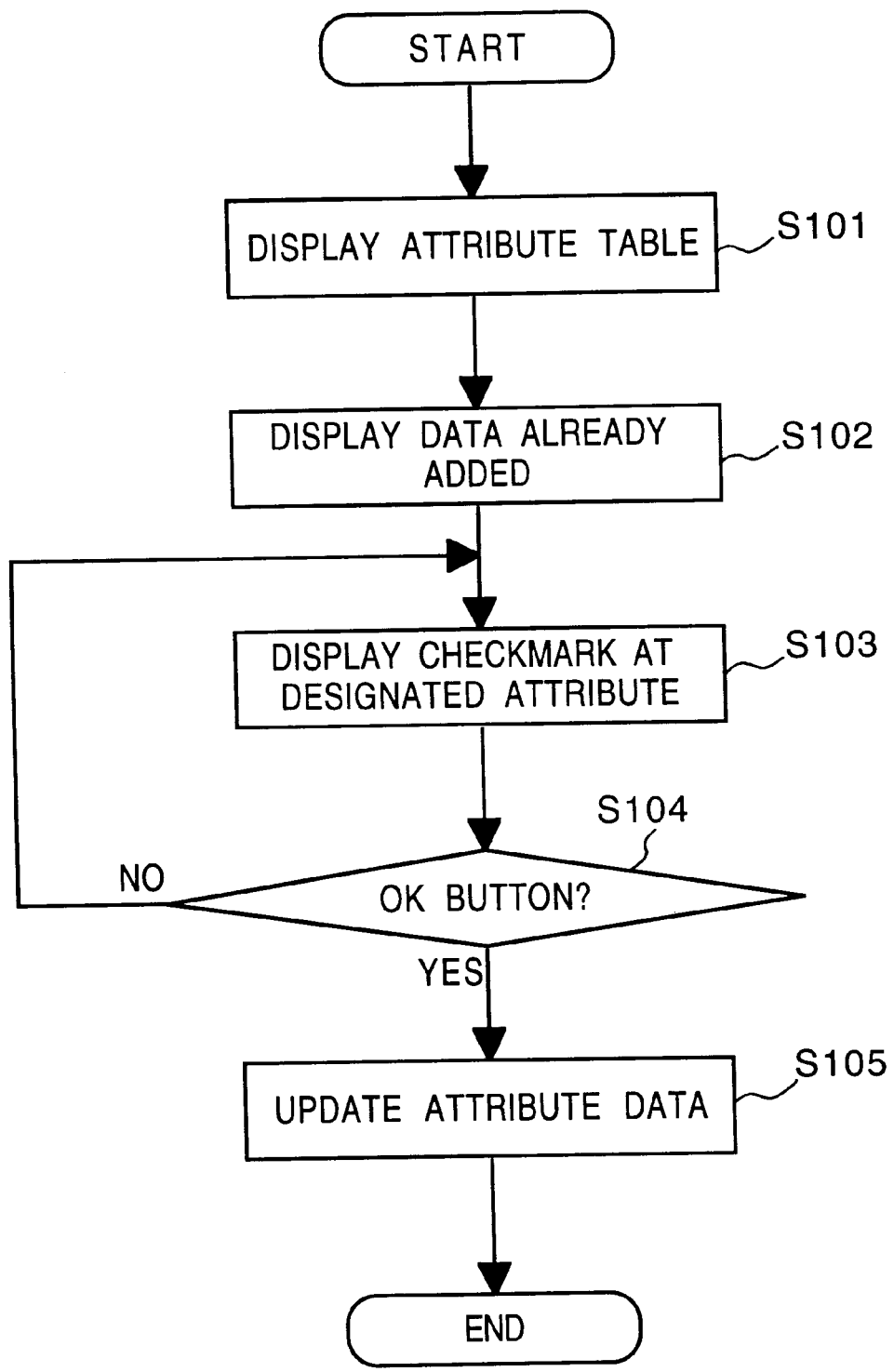
FIG. 16 is a flowchart showing processing steps of adding attribute data to the data-attribute table utilizing already-defined location data.

FIG. 16 is a flowchart describing operation steps of the attribute-data addition unit 2 when attributes are to be added utilizing already-defined location data. When starting of the addition operation of attribute data utilizing the already-defined location is instructed, and when data to which attribute data is to be added is designated, an attribute table such as that shown in FIG. 14 is displayed on the basis of location-data table (step S101). Herein, if location data is already registered for the designated data, a check-mark is placed at an attribute corresponding to the registered location data (step S102). When one of locations is selected from the attribute table (main office building of Company A is selected in FIG. 14), a check-mark is displayed in a checkbox beside the designated attribute (step S103). Upon depressing an OK button (not shown), the selected attribute location data is added to the designated data and the data-attribute table 10a is updated (Steps S104 and S105). Needless to say, a plurality of location data (e.g. a main office building of Company A and a distributor CD of company B) may be set for one data.

FIG. 17 shows an example of a screen display in the case where a new location is set as location data according to the present embodiment. On the input screen shown in FIG. 17, a location name is inputted and values indicative of range data is designated. More specifically, the screen for input shown in FIG. 17 can be used when latitude and longitude are known to a user. By inputting the name of the location (e.g. Office DD of Company E) and latitude and longitude thereof (range), the range of the location is registered to the attribute table. In a case where plural locations are to be included as attributes, a continue button is depressed, thereafter the same screen is displayed enabling plural inputs.

FIG. 18 shows an example of a screen display in a case where a current location is set as new location data according to the present embodiment. The input screen shown in FIG. 18 is an example for a case where a user is to register a current location of the apparatus as new location data. By inputting a name of the location and selecting its range, location data is registered in the attribute table.

FIG. 19 shows another example of setting a new location as location data according to the present embodiment. In FIG. 19, when database for a map is included in the apparatus or in a server, location data can be set by displaying the map and pointing at a desired location on the map. For instance, attribute's name is inputted, then an item (e.g. Shinjuku Station, Chiyoda-Ku, etc.) to search on the map is inputted, and a map corresponding to the search item is displayed. Upon selecting and designating a desired location on the displayed map using an input device, latitude and longitude of the desired location is calculated and registered.

Figure 20:
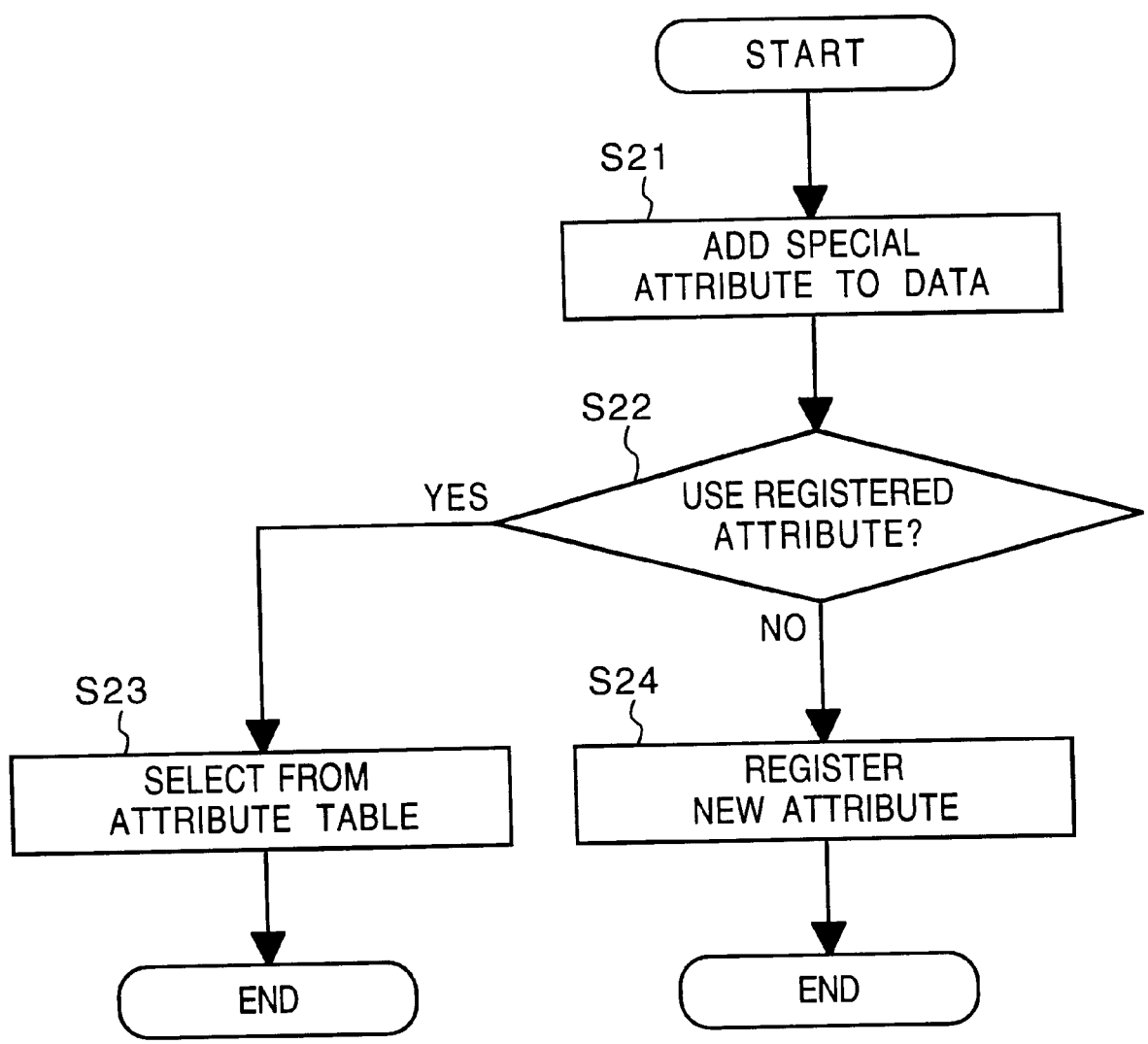
FIG. 20 is a flowchart describing a process of adding attribute data to the data-attribute table according to the present embodiment.

Processing steps of the foregoing process of adding attributes will now be described in detail. FIG. 20 is a flowchart describing the process of adding attribute data to the data-attribute table according to the present embodiment. First in step S21, when an addition process of adding attributes to data is selected from a menu and subject data to which the attribute is to be added is designated, a window inquiring whether to be using registered attribute data (location data) is displayed. When a selection is made to use the registered location data, the processing proceeds to step S23 where the process described with reference to FIG. 16 is performed. That is, registered attributes are displayed as an attribute table (FIG. 14) in the location-data table, and attribute data of the subject data is updated by a user selecting a desired location from the attribute table. Meanwhile, when a selection is made to use new location data in step S22, the processing advances to step S24 where a process which will be described below with reference to FIG. 21 is performed, and new location data is registered utilizing one of the above described plural types of registration methods (FIGS. 17–19).

Figure 21:
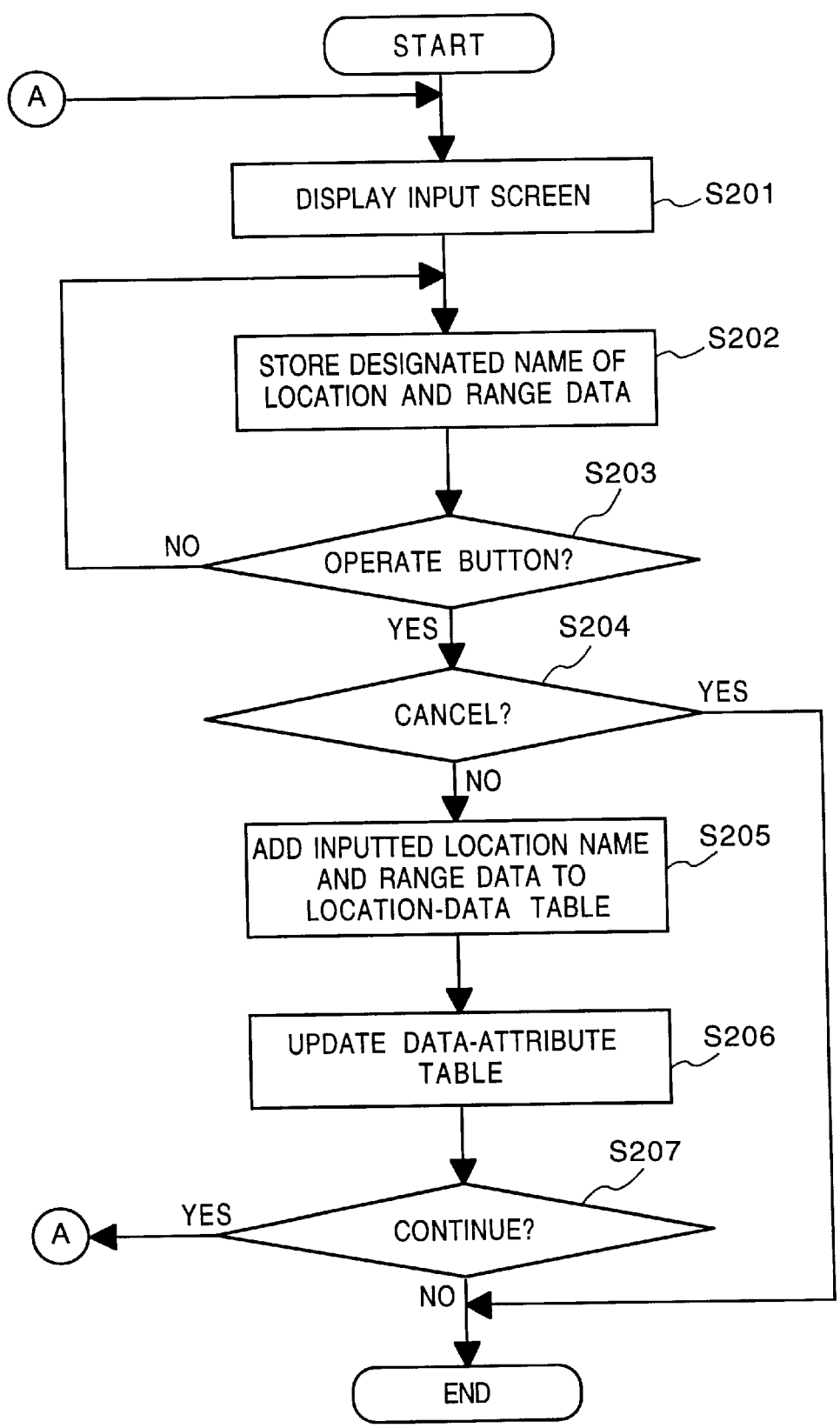
FIG. 21 is a flowchart describing the processing steps of setting a new location as location data.

FIG. 21 is a flowchart describing operation of the attribute-data addition unit 2 in the case of designating a new location. First in step S201, an input screen shown in any of FIGS. 17–19 is displayed. A user, for instance, may designate a desired setting method from a menu, in order to decide which input screen to be used. In step S202, a name of the location, range data thereof and the like are stored as a result of the input operation on the displayed input screen. For instance in the input screen shown in FIG. 17, text array data for the name of the location and value data for latitude and longitude are stored. On the input screen shown in FIG. 18, a current location of the data processing apparatus is obtained from the GPS, and a specified range of area (within 100 m or 200 m circle) having the obtained current location as its center is stored as range data. Moreover in the input screen shown in FIG. 19, a square circumscribing an inputted circle mark on the map is obtained, and converted into latitude and longitude to be used as range data.

When a "cancel" button is operated, the processing ends without performing the registration (steps S203 and S204). When an "OK" button or a "continue" button is operated, the processing proceeds to step S205 where the name of the location and range data (location data) stored in step S202 are registered in the location-data table shown in FIG. 15. In step S206, the above described location data is added to attribute data of the subject data in the data-attribute table 10a.

Note that the new location data newly set as described above with reference to FIGS. 17–19 becomes subject data to be set as attribute data and is automatically registered in the location-data table shown in FIG. 15. As a result, it is possible to select an attribute concerning location from the attribute table shown in FIG. 14 in a forthcoming location-data setting. Also, it is preferable to include a method for deleting a desired attribute data from the attribute table shown in FIG. 14. Since the method is simple, description thereof will be omitted. It is also apparent that desired location data can be deleted from the designated data.

In the foregoing descriptions, descriptions are provided on a portable data processing apparatus; however, it is also possible to utilize location data at the time of data access in a desktop-type apparatus or in a system capable of data communication between portable data processing apparatus and a host computer. More specifically, an apparatus may be configured such that the location of a client apparatus can always be confirmed when data access is requested to a host computer. By this, it is possible to verify that an apparatus requesting data access is a registered apparatus.

As set forth above, according to the first embodiment, to protect confidential information, permission of data access is determined utilizing a location detection mechanism such as GPS, in addition to a password. By virtue of the feature, data access from a location other than registered locations is not permitted; therefore, protection of confidential information is assured.

Note that in the first embodiment, the access location and a password are set as conditions of limitation; however the limitation condition may be set by an access location only. In this case, protection of confidential information may be less secure compared to the case of using both a password and an access location. However, protection of confidential information is realized without inputting extra information e.g. a password, since location data can be easily obtained by GPS or the like. In other words, operability can be improved in addition to secured protection of confidential information. Moreover, since a location of access is limited, a setting can be made to prohibit access outside a company for such information confidential to the company. Thus, confidentiality of information can be secured in an effective manner.

Furthermore, according to the foregoing embodiment, even in a case where the data-attribute table 10a and data contents are stored in a floppy disc or the like, it is also possible to prohibit access to the data stored in the floppy disk, from a location other than the designated location. Accordingly, confidentiality of the data stored in a floppy disk can be assured.

<Second Embodiment>

In the first embodiment, GPS is utilized as a location determining method. In the second embodiment, a PHS (Personal Handy-phone System) is utilized.

Figures 22, 23:
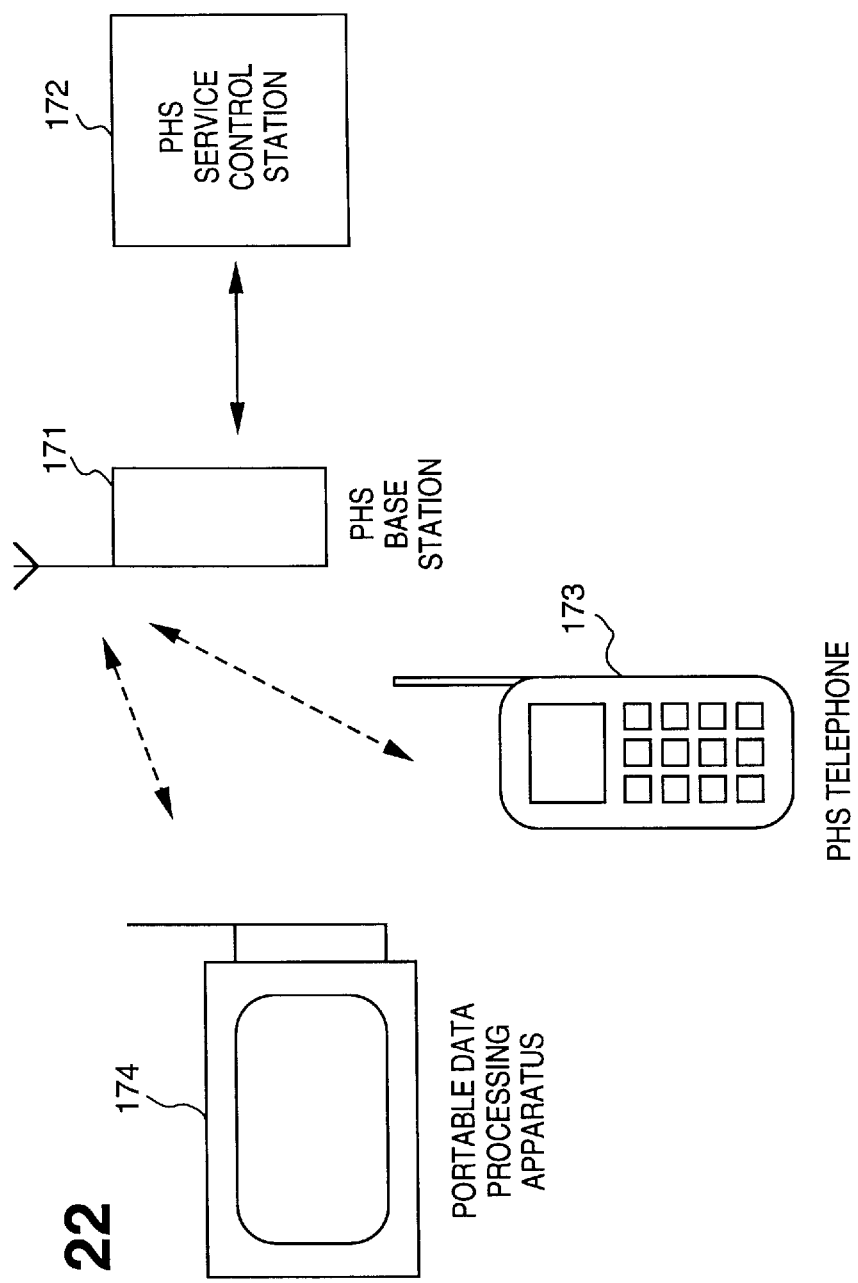
FIG. 22 is a view showing an overall PHS system.
FIG. 23 is an explanatory view describing the TDMA/TDD transmission scheme which is a characteristic of the PHS system.

FIG. 22 is a view showing an overall PHS system. Currently, a PHS service taking advantage of the characteristics of a portable telephone and a home cordless telephone is available in Japan. There is a plan to introduce the PHS also in several other countries. Although the PHS is manufactured as a telephone, it can also be utilized in digital data communication, thus will be integrated in a portable data processing apparatus using a PCMCIA card or the like.

Since the PHS has a weaker output of a radio wave compared to a portable telephone, a cell station 171 can cover only a small area. In order to connect with a public phone line, a PHS service control station 172 must know as to where a PHS device 173 is located. When the PHS device 173 is called from a general telephone, and if the location of the PHS device 173 is not known, all cell stations must be called. The PHS device 173 stores location data (ID) of a cell station which covers the device. The stored ID is compared with, at predetermined intervals, location data of the cell station 171 which currently covers the device, to determine whether or not the two location data match. If the location data do not match, the stored ID data is updated and a location-register signal is sent to the cell station 171. The cell station 171 informs the service control station 172 that the cell station covering the PHS device 173 has changed, and the new station is registered.

During the above described process, the PHS device 173 always knows the location of itself in the form of an ID of the cell station.

In the second embodiment, an example will be provided in a case where an ID of a covering cell station is applied in a PHS system.

FIG. 23 is a view for explaining the TDMA/TDD transmission scheme which is a characteristic of the PHS system. The details of the TDMA/TDD transmission scheme are to be referred to "RCR STD-28 The Second Generation of Cordless Telephone System Standard, the First Edition."

The TDMA scheme is to share a single frequency with plural channels, in the PHS system, with four channels (A, B, C and D). The TDD scheme is to use a single frequency to transmit a signal from a terminal to a cell station and from a cell station to a terminal. There are four slots available in one cell station for sending/receiving signals, and one of them is used for controlling communication of the cell station including ID transmission (in other words, one of them is allocated to a system). Thus, one frequency allocation allows communication with up to three PHS devices. Herein, assuming that AR and AT are allocated to a system, the cell station transmits an ID of itself during the allocated time of the system slot. According to the second embodiment, this ID is received and a current location is determined.

Figure 24:
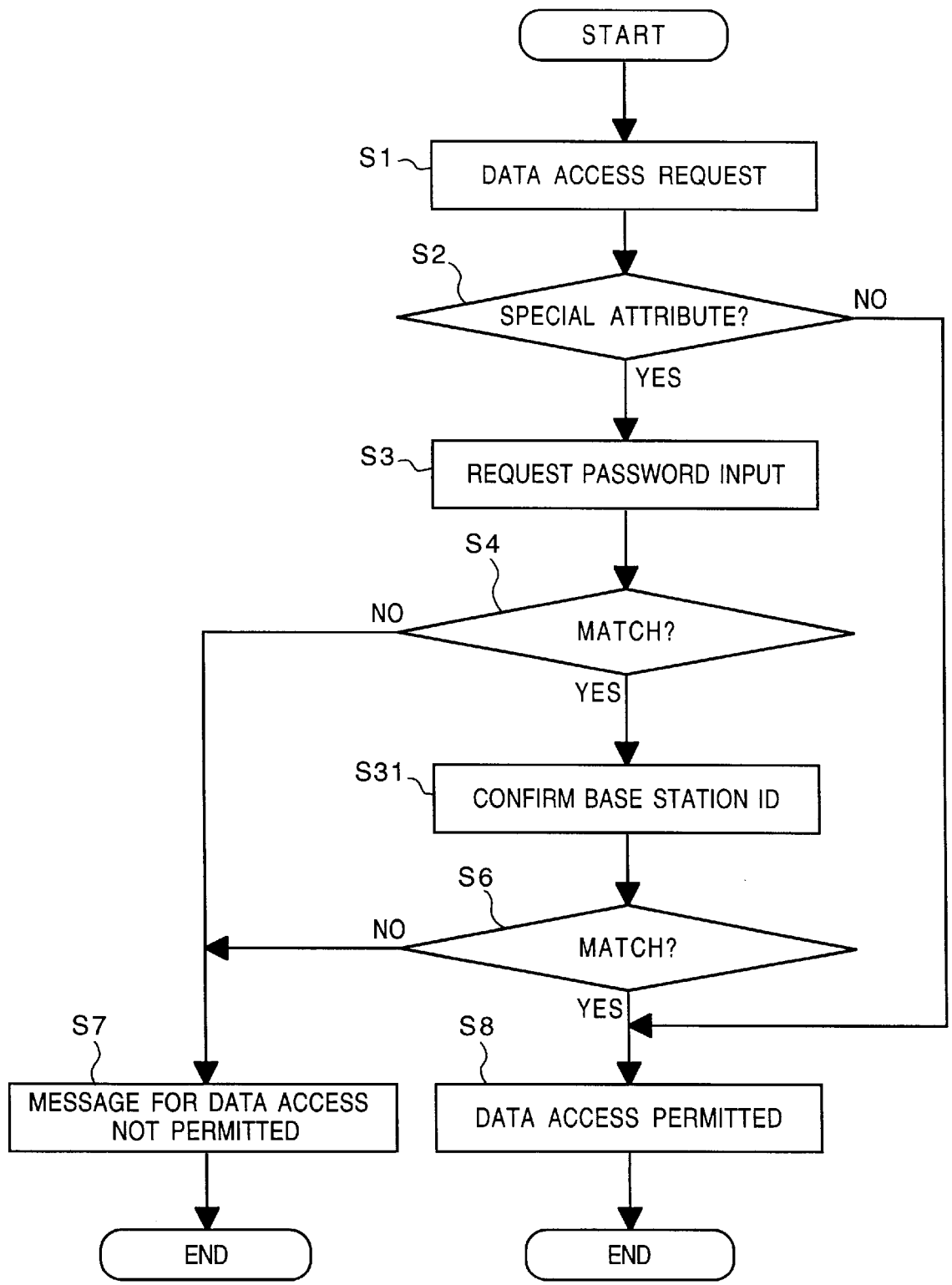
FIG. 24 is a flowchart describing a process of determining whether to permit data access, applying an ID of a cell station to location detection.

FIG. 24 is a flowchart describing a process of determining permission or non-permission of data access, employing the ID of the cell station to detect a location. Note that the same step reference numerals are assigned to those steps identical to the first embodiment (FIG. 13), and detailed descriptions thereof will be omitted.

In step S31, a portable data processing apparatus 174 obtains an ID of a cell station currently covering the apparatus based on the PHS system standard, and compares the ID with location data predeterminedly set in file data. If both the location data match, the data access is permitted. As described above, since an access is limited, the object of the present invention can be attained. Moreover, since the area where the radio wave of the PHS reaches is small, the cell station may be established at, for instance, every floor of a building. By virtue of the second embodiment, more detailed setting of limitation to data access is possible, e.g. setting limitation to data access for each floor.

With respect to registration of location data, mainly a current location is registered since the location detection is not based on general criteria (e.g. latitude and longitude) used by the GPS or the like. However, it is possible that the communication industry undertakes the service which provides correspondences between a location (latitude and longitude) and a cell station. In such case, registration of location data using latitude and longitude is possible.

Furthermore, in the second embodiment, descriptions are provided for a case where the PHS is used as a form of determining location. The present invention is not limited to this, but is applicable to any form of communication having an individual ID and covering a relatively limited communication area. For instance, optical communication IrDA may also be utilized.

As set forth above, according to the second embodiment, data protection taking advantage of accessing-location data is realized by utilizing an ID of a fixed station in a communication system as location data. By virtue of this feature, access to data regarding important information cannot be realized from a location other than designated locations, thereby reinforcing protection of confidential information.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the new functions according to the invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments. Briefly, the storage medium stores each module shown as an example of a memory map in FIG. 31.

More specifically, program codes which correspond to "first obtain process module," "second obtain process module," and "determination process module," at least, are to be stored in the storage medium. Note that the first obtain process module is a program module which executes a process of obtaining first location data indicative of a current location of the subject data processing apparatus, utilizing a GPS or the like. The second obtain processing module is a program module which executes, when an access request is made, a process of obtaining second location data indicative of a range within which data access is possible, in accordance with attribute data added to data to be accessed. The determination process module is a program module which executes a process of determining whether or not an access to the subject data is to be permitted in accordance with the first and second location data obtained respectively in the first obtain process and the second obtain process.

As set forth above, according to the present invention, permission or non-permission of data access is determined in accordance with a current location of an apparatus which requests the data access, thus more strict protection of confidential information is enabled. In other words, by virtue of the feature where an access location from which data is accessed is limited, confidentiality of confidential information is secured in a stricter manner; for instance, confidential information can be set such that an access from outside the office is prohibited.

Moreover, for determining permission or non-permission of data access, if a password added to the data is used in addition to a current location of the apparatus, confidentiality of the information can be kept even more strictly.

Furthermore, by utilizing the GPS to obtain location data indicative of a current location of the apparatus, an accurate location can be detected.

Still further, an apparatus may be structured such that an ID of a fixed system in a predetermined communication system is obtained as location data indicative of a current location of the apparatus. On account of the structure, it is possible to utilize the PHS system and the like.

Still further, by performing addition operation of location data to data on the basis of detected current location data, setting of location data becomes quite easy in an information processing apparatus e.g. a desktop-type apparatus.

Moreover, setting of location data in a portable-type information processing apparatus can be easily realized by designating a desired location and range thereof.

The present invention can be applied to the system comprising either a plurality of units or a single unit. It is needless to say that the present invention can be applied to the case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the appended claims.

What is claimed is:

1. A data processing apparatus comprising:

first obtain means for obtaining first location data which indicates a current location of said apparatus;

storing means for storing a plurality of subject data, wherein respective second location data is added to each of the plurality of subject data indicating an accessible location of the respective subject data;

second obtain means for obtaining the respective second location data corresponding to a desired one of the subject data to be accessed from said storing means; and determination means for determining whether or not an access to the desired subject data is to be permitted in accordance with the first location data and the respective second location data.

2. The data processing apparatus according to claim 1, wherein each subject data has a respective registered Password stored in said storing means in association with the respective subject data and wherein said second obtain means obtains the respective second location data and the respective registered password, and said determination means determines whether or not an access to the desired subject data is to be permitted in accordance with a password input at a time of accessing the desired subject data and the first location data obtained by said first obtain means, and the registered password and the second location data obtained by said second obtain means.

3. The data processing apparatus according to claim 1, wherein each of the second location data includes respective range data indicative of an access area within which data access is permitted, and said determination means permits an access to the desired subject data when the first location data is within a range specified by the respective second location data.

4. The data processing apparatus according to claim 1, wherein said first obtain means obtains first location data indicative of a cur-rent location of said apparatus by utilizing a GPS.

5. The data processing apparatus according to claim 1, wherein said first obtain means obtains an ID of a fixed station in a predetermined communication system as said first location data.

6. The data processing apparatus according to claim 5, wherein the predetermined communication system is a PHS (Personal Handy-phone System).

7. The data processing apparatus according to claim 3, further comprising addition means for adding the respective second location data including the range data to the subject data.

8. The data processing apparatus according to claim 7, wherein the range data to be added by said addition means is obtained on the basis of the first location data obtained by said first obtain means.

9. The data processing apparatus according to claim 7, wherein the range data to be added by said addition means is designated by latitude and longitude.

10. The data processing apparatus according to claim 7, wherein said addition means comprises:

a display for displaying a map;

detection means for detecting an area designated on the displayed map; and decide means for deciding the range data on the basis of the area detected by said detection means.

11. A data processing method of controlling a data access operation of a data processing apparatus, comprising:

a first obtain step of obtaining first location data which indicates a current location of the data processing apparatus;

a storing step of storing, in a storing means, a plurality of subject data, wherein respective second location data is added to each of the plurality of subject data indicating an accessible location of the respective subject data;

a second obtain step of obtaining the respective second location data corresponding to a desired one of the subject data to be accessed from the storing means; and a determining step of determining whether or not an access to the desired subject data is to be permitted in accordance with the first location data and the respective second location data.

12. The data processing method according to claim 11, wherein each subject data has a respective registered Password stored in the storing means in association with the respective subject data and wherein in said second obtain step, the respective second location data and the respective registered password are obtained, and in said determining step, it is determined whether or not an access to the desired subject data is to be permitted in accordance with a password input at a time of accessing the desired subject data and the first location data obtained in said first obtain step, and the registered password and the second location data obtained in said second obtain step.

13. The data processing method according to claim 11, wherein each of the second location data includes respective range data indicative of an access area within which data access is permitted, and in said determining step, an access to the desired subject data is permitted when the first location data is within a range specified by the respective second location data.

14. The data processing method according to claim 11, wherein in said first obtain step, first location data indicative of a current location of the data processing apparatus is obtained by utilizing a GPS.

15. The data processing method according to claim 11, wherein in said first obtain step, an ID of a fixed station in a predetermined communication system is obtained as said first location data.

16. The data processing method according to claim 15, wherein the predetermined communication system is a PHS (Personal Handy-phone System).

17. The data processing method according to claim 13, further comprising a step of adding the respective second location data including the range data to the subject data.

18. The data processing method according to claim 17, wherein the range data to be added in said adding step is obtained on the basis of the first location data obtained in said first obtain step.

19. The data processing method according to claim 17, wherein the range data to be added in said adding step is designated by latitude and longitude.

20. The data processing method according to claim 17, wherein in said adding step, a map is displayed, an area designated on the displayed map is detected; and the range data is decided on the basis of the detected area.

21. A data processing system where a second data processing apparatus provides data in response to a data request sent by a first data processing apparatus, comprising:

first obtain means for obtaining first location data in accordance with a current location of said first data processing apparatus;

storing means for storing a plurality of subject data, wherein respective second location data is added to each of the plurality of subject data indicating an accessible location of the respective subject data;

transmission means for transmitting the first location data to said second data processing apparatus along with an access request for a desired one of the subject data;

second obtain means for obtaining the respective second location data corresponding to the desired subject data to be accessed from said storing means; and determination means for receiving the access request transmitted by said transmission means, and determining whether or not an access to the desired subject data is to be permitted for said first data processing apparatus in accordance with the first location data and the respective second location data.

22. A computer readable memory which stores program codes for controlling a data access operation of a data processing apparatus, comprising:

program codes for a first obtain step of obtaining first location data which indicates a current location of the data processing apparatus;

program codes for a storing step of storing, in a storing means, a plurality of subject data, wherein respective second location data is added to each of the plurality of subject data indicating an accessible location of the respective subject data;

program codes for a second obtain step of obtaining the respective second location data corresponding to a desired one of the subject data to be accessed from the storing means; and program codes for a determining step of determining whether or not an access to the desired subject data is to be permitted in accordance with the first location data and the respective second location data.

* * * * *

UNITED STATES PATENT AND TRADEMARK OFFICE
CERTIFICATE OF CORRECTION

PATENT NO. : 5,922,073
DATED : JULY 13, 1999
INVENTOR(S) : KAZUTOSHI SHIMADA

It is certified that error appears in the above-identified patent and that said Letters Patent is hereby corrected as shown below:

COLUMN 12

Line 54, "Pass-" should read --pass---.

COLUMN 13

Line 8, "cur-rent" should read --current--;
Line 52, "Pass-" should read --pass---.

Signed and Sealed this

Eighteenth Day of January, 2000

Attest:

Q. TODD DICKINSON

*Attesting Officer*   *Commissioner of Patents and Trademarks*